United States Patent [19]

Mink

[11] Patent Number: 4,955,989

[45] Date of Patent: Sep. 11, 1990

[54] PROCESS FOR CONVEYING A PARTICULATE SOLID FUEL

[75] Inventor: Bernardus H. Mink, The Hague, Netherlands

[73] Assignee: Shell Oil Company, Houston, Tex.

[21] Appl. No.: 8,099

[22] Filed: Jan. 23, 1987

Related U.S. Application Data

[63] Continuation of Ser. No. 726,949, Apr. 26, 1985, abandoned, which is a continuation of Ser. No. 487,531, Apr. 21, 1983, abandoned.

[30] Foreign Application Priority Data

Jun. 23, 1982 [NL] Netherlands .................. 8202532

[51] Int. Cl.$^5$ .............................................. C10J 3/50
[52] U.S. Cl. .................................. 48/197 R; 48/86 R; 48/210; 48/DIG. 4; 406/124
[58] Field of Search ............... 48/86 R, 197 R, 206, 48/210, DIG. 4; 414/217, 218, 221; 406/124–126; 252/373

[56] References Cited

U.S. PATENT DOCUMENTS

| | | | |
|---|---|---|---|
| 2,113,774 | 4/1938 | Schmalfeldt | 48/210 |
| 3,698,882 | 10/1972 | Ganett et al. | 48/210 |
| 3,775,071 | 11/1973 | Hoffert et al. | 48/197 R |
| 3,861,885 | 1/1975 | Schora | 48/210 X |
| 3,963,426 | 6/1976 | Hand | 48/210 |
| 3,994,701 | 11/1976 | Schnelmanns | 48/86 R |
| 4,094,651 | 6/1978 | Donath | 48/DIG. 4 X |
| 4,108,500 | 8/1978 | Stamer | 406/124 |
| 4,397,657 | 8/1983 | Selep et al. | 48/86 R |

FOREIGN PATENT DOCUMENTS

| | | | |
|---|---|---|---|
| 4928002 | 7/1974 | Japan | 48/86 R |
| 144687 | 12/1979 | Japan | 406/124 |
| 51618 | 3/1982 | Japan | 406/124 |
| 995051 | 6/1965 | United Kingdom | 406/124 |

Primary Examiner—Joye L. Woodard

[57] ABSTRACT

Particulate solid fuel is conveyed from an atmospheric container into an atmospheric lock hopper which is then pressurized by a high pressure inert gas. The fuel is passed from the pressurized lock hopper into a pressure vessel and subsequently from this vessel into a gasification reactor. In the container and the lock hopper the solid fuel is fluidized by an inert gas. In the pressure vessel synthesis gas is used for this purpose, the latter gas also being applied for the pneumatic transport of the fuel from the vessel into the reactor.

4 Claims, 1 Drawing Sheet

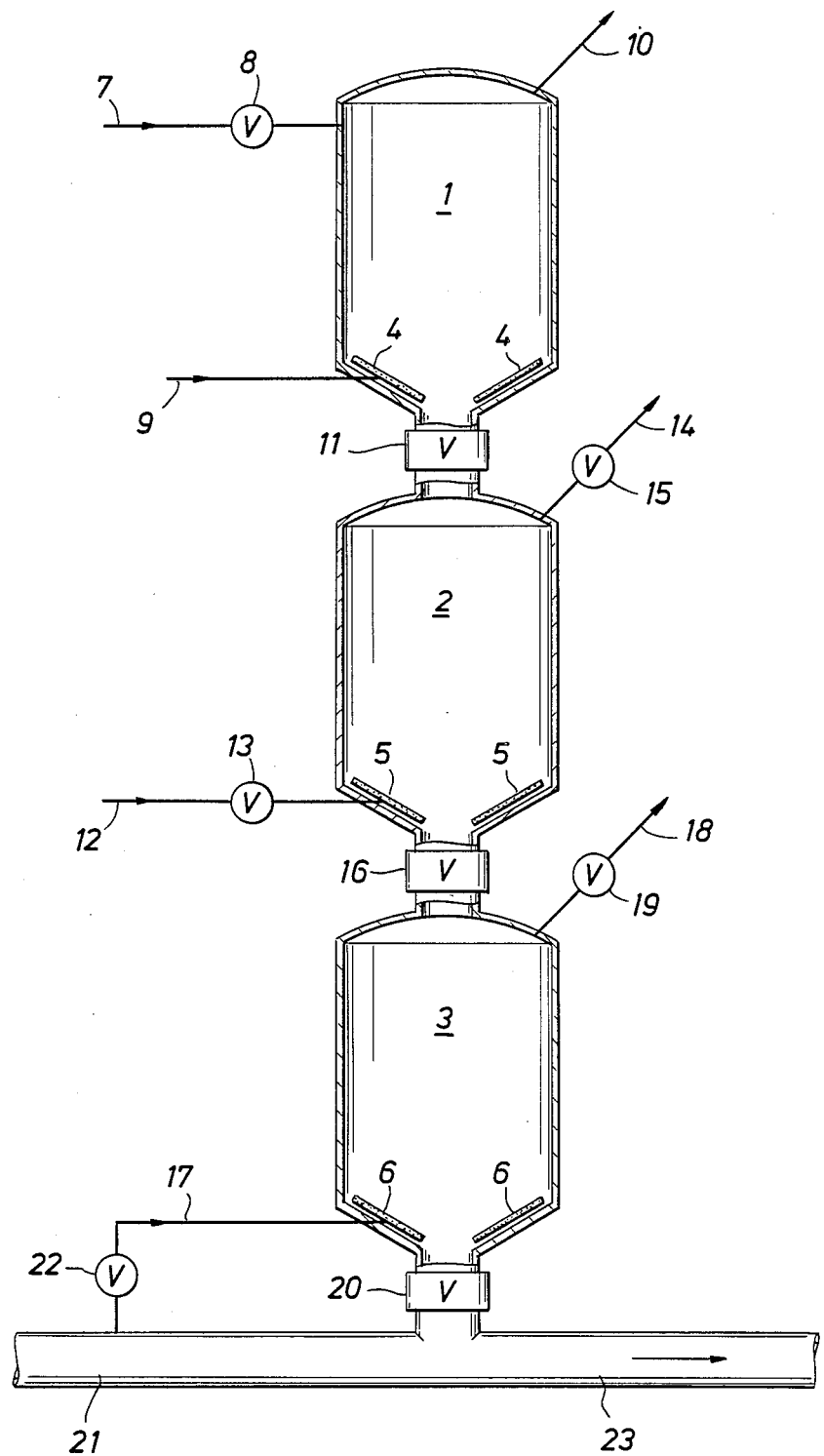

PROCESS FOR CONVEYING A PARTICULATE SOLID FUEL

This is a continuation of application Ser. No. 726,949, filed Apr. 26, 1985, which is in turn a continuation of application Ser. No. 487,531 filed Apr. 21, 1983, all of which are abandoned.

FIELD OF THE INVENTION

The present invention is directed to an improved lock hopper system for introducing a particulate solid fuel at atmospheric pressure into a synthesis gas reactor operated at elevated pressure.

BACKGROUND OF THE INVENTION

Processes for conveying a particulate solid fuel from an atmospheric container by means of a lock system to a reactor in which the fuel is partially combusted at elevated pressure to synthesis gas are known. Generally, the fuel is conveyed from the container to a lock hopper that is pressurized by pressing an inert gas into the lock hopper and then the fuel is subsequently passed from the lock hopper to a pressure vessel at at least the same pressure as that in the reactor and from the pressure vessel to the reactor.

The process is used in the gasification of solid fuel. The fuel reacts with the oxygen-containing gas owing to which the synthesis gas is formed, a gas mixture mainly consisting of carbon monoxide and hydrogen. In addition to an oxygen-containing gas, a moderator is preferably introduced into the reactor for the conversion of the fuel. A moderator has a moderating effect on the temperature of the partial combustion, since it reacts endothermically with the products and/or reactants of the partial combustion reaction. Suitable moderators are steam and carbon dioxide.

As suitable fuel coal and brown coal, oil shale, wood etc., are considered.

As oxygen-containing gas air can be used. The resulting synthesis gas, however, then contains a considerable quantity of nitrogen. To prevent this oxygen-enriched gas or substantially pure oxygen is usually applied. The oxygen is generally obtained from an apparatus in which air is separated into oxygen and nitrogen.

The pressure in the reactor is preferably 15-80 bar.

The resulting synthesis gas can be used for a variety of purposes. It can be used as fuel. Its hydrogen content can be increased by converting carbon monoxide with steam into carbon dioxide and hydrogen. After its separation from the resulting gas mixture the hydrogen can be used in the synthesis of ammonia. The synthesis gas can also serve as raw material for the synthesis of hydrocarbons and/or oxygen-containing hydrocarbons, such as methanol. In that case pure oxygen is preferably used as oxygen-containing gas in the partial combustion.

Before the fuel is introduced into the reactor by means of the lock system, the fuel is preferably ground and dried. By the grinding fine fuel particles are obtained, which contributes to a good gasification. The water present in the fuel is vaporized in the reactor. The vaporization requires energy, which may adversely affect the gasification. To avoid this the fuel is dried. Moreover, the low water content facilitates the transport of the fuel with a carrier gas, since the fuel particles are now less inclined to stick together.

Nevertheless, dried particles can sometimes also stick together when they lie packed in the lock system. Then bridging may occur across the discharge of a vessel to another vessel. Consequently, the transport of the particles is impeded. The present invention aims at providing a process in which the fuel particles no longer stick together. Another object of the invention is to provide a process in which the fuel is passed to the reactor in a carrier gas, without the synthesis gas to be formed being contaminated by gaseous components in the carrier gas.

SUMMARY OF THE INVENTION

The invention therefore relates to a process for conveying particulate solid fuel from an atmospheric container by means of a lock system to a reactor in which the fuel is partially combusted at elevated pressure to synthesis gas with an oxygen-containing gas, in which process the fuel is conveyed from the container to a lock hopper that is pressurized by pressing an inert gas into the lock hopper, the fuel is subsequently passed from the lock hopper to a pressure vessel at least the same pressure as that in the reactor and from the pressure vessel to the reactor, characterized in that the fuel is kept in the fluidized state in the container and lock hopper by means of an inert fluidizing gas and in the pressure vessel by means of a carbon monoxide- and hydrogen-containing fluidizing gas, and that the fuel is passed from the pressure vessel to the reactor by means of a carbon monoxide- and hydrogen-containing carrier gas.

BRIEF DESCRIPTION OF THE DRAWING

The drawing is a simplified cross-sectional view of the apparatus for operating the present process wherein three pressure vessels are employed, i.e., an atmospheric vessel, a lock hopper and a pressure vessel.

DESCRIPTION OF THE PREFERRED EMBODIMENTS

In the process according to the invention the fluidizing gas is passed into the vessels of the lock system so that the fuel particles are fluidized. They do not stick together, so that there are no blocking problems during the transport of the fuel particles through the lock system.

The fluidizing gases can advantageously be supplied to the vessels of the lock system through porous material in the bottom of the vessels. Suitable porous material is, for example, sintered metal.

By using a carrier gas consisting of carbon monoxide and hydrogen in the transport of the fuel from the pressure vessel to the reactor contamination of the synthesis gas to be formed is prevented. The carrier gas needs not consist completely of carbon monoxide and hydrogen. If it contains an equal amount of the same impurities as the synthesis gas, the synthesis gas to be formed is not contaminated in an additional degree. Consequently, the carrier gas is preferably recycled synthesis gas. The carrier gas can also contain components which themselves yield carbon monoxide and hydrogen in the partial combustion in the reactor. Components of this type are, for example, methane and ethane. In that case, too, the synthesis gas to be formed is not contaminated.

It is inevitable that some gas is passed from the pressure vessel together with the fuel. If the fluidizing gas in the pressure vessel should contain an inert gas, such as nitrogen, the inert gas that is passed from the pressure vessel together with the fuel would contaminate the synthesis gas to be formed. Since the carbon monoxide- and hydrogen-containing carrier gas is so chosen that it causes no contamination of the synthesis gas, the fluidizing gas in the pressure vessel preferably has the same composition as the carbon monoxide- and hydrogen-containing carrier gas. Consequently, the fluidizing gas in the pressure vessel is advantageously synthesis gas. In that case synthesis gas formed is cooled, freed from any entrained solid particles and recycled to the pressure vessel. Since it has been freed from solid particles, no blockages occur in the porous material through which it is passed into the pressure vessel. In addition to the advantage that in said case no contamination of the synthesis gas takes place, the use of recycled synthesis gas as fluidizing and carrier gas further has the advantage that it is already at elevated pressure so that the cost of compressing the fluidizing and carrier gas is saved.

Another suitable fluidizing gas for the pressure vessel is a residual gas of a synthesis of hydrocarbons and/or oxygen-containing hydrocarbons. In such a synthesis synthesis gas is passed over a suitable catalyst at elevated pressure. Since not the whole quantity of synthesis gas is converted under the process conditions applied, the non-converted synthesis gas can be recycled to the synthesis. Said stream of non-converted synthesis gas, however, is preferably fully or partly passed to the pressure vessel in the lock system.

In the synthesis small quantities of undesirable components, such as methane and ethane, are formed. Recirculation of said components with the non-converted synthesis gas to the synthesis would cause an accumulation of undeisrable components. Therefore, they are preferably recycled to the pressure vessel in the lock system together with the non-converted synthesis gas. The gas to be recycled is already at elevated pressure so that it needs not be compressed. Said undesirable components in this gas are converted into carbon monoxide and hydrogen in the gasification reactor, so that no contamination of the synthesis gas takes place.

For the fluidizing gas in the lock hopper and the container use is preferably made of a gas having an other composition than the fluidizing gas in the pressure vessel. After having served as fluidizing gas, the gas that is passed from the container and the lock hopper, has a lower pressure than the gas in the reactor and in the pressure vessel. Moreover, said gas can contain solid fuel particles. If the fluidizing gas used in the lock hopper and container is a carbon monoxide- and hydrogen-containing gas, said gas can only be reused as fluidizing gas or as carrier gas of the fuel to the reactor after it has been compressed, optionally after separation of solid fuel particles. This treatment involves high costs. If it is decided not to reuse the gas, the result is a loss of carbon monoxide and hydrogen.

Consequently, an inert gas is used as fluidizing gas in the lock hopper and container. The fluidizing gas in the container and lock hopper preferably has the same composition as the inert gas with which the lock hopper is pressurized. To this end a stream of inert gas can be separated into two branch streams. The gas of one branch stream is used as fluidizing gas in the container, the gas of the other branch stream after compression being applied as fluidizing gas in the lock hopper.

It is also possible to pass the complete stream of inert gas to the lock hopper, where it is used as fluidizing gas and as a gas to pressurize the lock hopper, after which the inert gas passed from the lock hopper is conducted to the container in which it is to serve as fluidizing gas. Whether said gas can be used as fluidizing gas in the container, depends on the quantity of solid fuel particles it contains and the corresponding risk of blockages in the supply of the fluidizing gas to the container.

If desired, part of the inert gas passed out of the lock hopper can be used to conduct fuel to the container, as described in U.S. Pat. No. 3,994,701. Subsequently, the inert gas can be vented, if desired after separation of the entrained solid particles.

The inert gases preferably used as fluidizing gas in the container and lock hopper are gases at least partly consisting of nitrogen and/or carbon dioxide. Especially nitrogen is advantageous because it becomes amply available from the apparatus in which air is separated into oxygen and nitrogen, if the oxygen is used in the partial combustion of the fuel. The obtained nitrogen can therefore advantageously be used in the lock system. The nitrogen originating from the air separator is dry, so that it does not cause agglomeration of the fuel particles as a result of moisture. Further, it does not contain solid particles so that no blockages occur in the porous material through which it is passed as fluidizing gas into the vessels of the lock system.

The gas passed out of the pressure vessel contains in additions to the fluidizing gas supplied to the latter, some gas from the lock hopper. The fact is that if the fuel is passed from the lock hopper into the pressure vessel, some inert gas also flows from the lock hopper into the pressure vessel. By choosing a favorable upward velocity for the fluidizing gas, the gas entrained from the lock hopper is displaced by fluidizing gas. Consequently, at the level of a certain horizontal section of the pressure vessel the fluidizing gas preferably has an upward velocity that is at least equal to the downward flow rate at which the fuel passes said section. In this manner gas is prevented from flowing from the lock hopper into the reactor, so that it cannot contaminate the synthesis gas to be formed. The fluidizing gas in the pressure vessel, preferably together with the inert gas that has found its way from the lock hopper into the pressure vessel, is removed from the pressure vessel via a discharge to an apparatus in which the fuel is dried and/or ground. The gas discharged from the pressure vessel also contains some entrained fuel particles. By passing the gas to the drying and/or grinding device the entrained fuel particles are added to the fuel to be used. Especially if the gas is used in a drier, it is preferably heated. This can be carried out by means of an indirect heat exchanger or by injecting a hot gas. It is also possible to burn the carbon monoxide- and hydrogen-containing gas so that the hot combustion gases, optionally mixed with another gas, are passed to the drying and/or grinding device.

The invention will now be described with particular reference to the drawing which is a cross-sectional view of the apparatus employed in the present process. The drawing shows only the essential features of the present process and the invention is not to be unduly limited or restricted thereto.

Through a line 7 particulate solid fuel is passed to an atmospheric container 1 by means of an inert carrier gas ($N_2$, $CO_2$). By means of a valve 8 in the line 7 the supply of fuel can be closed. Via a line 9 an inert gas ($N_2$, $CO_2$) is passed into the container through porous sintered metal 4, by which inert gas the fuel in the container 1 is fluidized. Through a discharge line 10 the inert carrier gas and the inert fluidizing gas are removed from the container 1, for example to a separator (not shown in the drawing), where any entrained fuel particles are separated from the gas.

By opening a valve 11 the fuel is passed to a lock hopper 2. When a suitable quantity of fuel has been introduced into the lock hopper 2, the valve 11 is closed. A valve 13 in a line 12 is opened so that an inert gas flows into the lock hopper via porous sintered metal 5, by which inert gas the fuel is fluidized and the pressure in the lock hopper 2 increases. When the pressure in the lock hopper 2 is sufficiently high, the supply of the inert gas via the valve 13 is so arranged that just sufficient gas is introduced to keep the fuel in the fluidized state. In a discharge line 14 a valve 15 is so set that the fluidizing gas introduced via the line 12 can escape so that the pressure of the lock hopper remains unchanged. Subsequently, a valve 16 is opened and the fuel flows from the lock hopper 2 to a pressure vessel 3. When all the fuel has left the lock hopper, the valve 16 is closed again. The valve 13 is also closed, whereupon the valve 15 is opened, owing to which the pressurized gas present escapes via the discharge line 14. When the pressure in the lock hopper 2 is substantially atmospheric, the valve 15 is also closed. Subsequently, the valve 11 is opened and the lock hopper 2 is again filled with fuel.

The fuel in the pressure vessel 3 is kept in the fluidized state by the injection of a carbon monoxide- and hydrogen-containing fluidizing gas via a line 17 and through porous sintered metal 6. By means of a valve 19 in a discharge line 18 it is arranged that such a quantity of gas is removed via the discharge line 18 from the pressure vessel 3 as is introduced via the line 17. Said discharged gas is passed to an apparatus in which the fuel is ground fine and dried (said apparatus is not shown in the drawing). A valve 20 is set in such a manner that such a quantity of fuel is introduced into a line 21 that the downward flow rate of the fuel at the level of a horizontal section of the pressure vessel 3 is lower than or equal to the upward velocity at which the fluidizing gas passes the section, so that inert gas that has flowed into the pressure vessel from the lock hopper is displaced by the carbon monoxide- and hydrogen-containing fluidizing gas. The quantity of fluidizing gas introduced into the pressure vessel 3 is arranged by means of a valve 22 in the line 17.

Through the line 21 a carbon monoxide- and hydrogen-containing carrier gas is supplied. Part of said gas is introduced as fluidizing gas into the pressure vessel via the valve 22 and the line 17. The remaining part serves as carrier gas for the fuel that is passed via the valve 20 into the line 23. The gas transports the fuel to a reactor (not shown) in which the fuel is partially combusted.

What is claimed is:

1. A process for conveying particulate solid fuel from an atmospheric container to a reactor, in which reactor the fuel is partially combusted at elevated pressure to synthesis gas with an oxygen-containing gas, comprising passing the fuel from said container to a lock hopper, pressurizing the lock hopper by pressing an inert gas into the lock hopper, passing the fuel from the lock hopper to a pressure vessel, said pressure vessel having at least the same pressure as the pressure in the reactor, and from the pressure vessel to the reactor, said fuel being kept in the fluidized state in the container and the lock hopper by an inert fluidizing gas and in the pressure vessel by a carbon monoxide- and hydrogen-containing fluidizing gas, the fuel being passed from the pressure vessel to the reactor by a carbon monoxide- and hydrogen-containing carrier gas, the fluidizing gas at the level of a horizontal section of the pressure vessel having an upward velocity which is at least equal to the downward flow rate at which the fuel passes said section.

2. The process of claim 1 wherein the solid fuel is coal.

3. A process for conveying particulate solid fuel from an atmospheric container to a reactor, in which reactor the fuel is partially combusted at elevated pressure to synthesis gas with an oxygen-containing gas, comprising passing the fuel from said container to a lock hopper, pressurizing the lock hopper by pressing an inert gas into the lock hopper, passing the fuel from the lock hopper to a pressure vessel, said pressure vessel having at least the same pressure as the pressure in the reactor, and from the pressure vessel to the reactor, said fuel being kept in the fluidized state in the container and the lock hopper by an inert fluidizing gas and in the pressure vessel by a carbon monoxide- and hydrogen-containing fluidizing gas, the fuel being passed from the pressure vessel to the reactor by a carbon monoxide- and hydrogen-containing carrier gas, the fluidizing gas in the pressure vessel, together with the inert gas that has found its way from the lock hopper into the pressure vessel, being removed from the pressure vessel via a discharge to an apparatus in which the fuel is dried and/or ground.

4. The process of claim 3 wherein the solid fuel is coal.

* * * * *